United States Patent [19]

Yano et al.

[11] 4,281,329
[45] Jul. 28, 1981

[54] LIQUID RECORDING MEDIUM

[75] Inventors: Yasuhiro Yano, Tokyo; Masahiro Haruta, Funabashi; Tokuya Ohta, Yokohama, all of Japan

[73] Assignee: Canon Kabushiki Kaisha, Tokyo, Japan

[21] Appl. No.: 49,956

[22] Filed: Jun. 19, 1979

[30] Foreign Application Priority Data

Jun. 20, 1978 [JP] Japan ................... 53-75145
Jun. 1, 1979 [JP] Japan ................... 54-68562

[51] Int. Cl.$^3$ .................. G01D 9/00; C09D 11/00
[52] U.S. Cl. ............................. 346/1.1; 346/75; 346/140 R; 106/20; 106/21; 106/22; 106/23
[58] Field of Search ............... 106/20, 21, 22, 23; 8/92; 346/140 R, 1; 424/70

[56] References Cited

U.S. PATENT DOCUMENTS

| | | | |
|---|---|---|---|
| 3,458,313 | 7/1969 | Webb | 96/49 |
| 3,565,571 | 2/1971 | Reese et al. | 424/70 |
| 3,630,664 | 12/1971 | Nentwig et al. | 8/92 |
| 3,687,887 | 8/1972 | Zabiak | 260/29.6 E |
| 3,705,043 | 12/1972 | Zabiak | 106/22 |
| 3,705,045 | 12/1972 | Nadolski | 106/22 |
| 3,758,272 | 9/1973 | Datye et al. | 8/173 |
| 3,776,742 | 12/1973 | Sanders | 106/22 |
| 4,106,027 | 8/1978 | Hoffman et al. | 106/22 |
| 4,153,467 | 5/1979 | Yano et al. | 106/22 |
| 4,170,482 | 10/1979 | Mansukhani | 106/22 |

*Primary Examiner*—V. P. Hoke
*Attorney, Agent, or Firm*—Fitzpatrick, Cella, Harper & Scinto

[57] ABSTRACT

A liquid recording medium for use in a recording device, wherein the liquid recording medium is discharged from a discharge orifice in a recording head of the device and spattered in the form of droplets contains a carbonic acid ester compound having an aliphatic radical.

70 Claims, 3 Drawing Figures

LIQUID RECORDING MEDIUM

BACKGROUND OF THE INVENTION

1. Field of the Invention

This invention relates to liquid recording medium suitable for use in a recording method which performs image recording by ejecting and spattering the liquid recording medium in the form of droplets from an orifice of a nozzle onto a recording member. More particularly, the invention is concerned with a novel liquid recording medium with various properties of remarkable improvement such as stability and responsiveness of the droplets at their ejection from the discharge orifice, stability in storage over a long period of time, affinity for recording members, quality of the image to be recorded, and so forth.

2. Description of Prior Art

So-called non-impact recording methods have recently drawn public attention, because uncomfortable noises during the recording operation could be reduced to a negligible order. Among these particularly important is the so-called ink jet recording method which allows high-speed recording on a plain paper without particular image-fixing treatment, and, in this particular field, there have been proposed various approaches including those already commercialized, and others still under development.

Such ink jet recording method is to perform recording by spattering the liquid recording medium, or the so-called "ink", in the form of droplets and adhering the same onto the recording member. The recording medium to be used for such recording method is usually composed, as its principal constituent, of a recording agent (various sorts of dyestuff and pigment) to form a recorded image which is dispersed or dissolved in water, organic solvent, or a mixture of these. When some treatment is rendered onto the recording member to form color at the time of the recording on such recording member, the liquid recording medium may sometimes be composed only of water, organic solvent, or a mixture thereof, without inclusion of the various sorts of dyestuff and pigment. Such ink jet recording can be classified into several processes according to the method of generating the droplets and also to the method of controlling the direction of spattering of the droplets. In either system, the liquid recording medium is required to have various physical parameters such as viscosity, surface tension, electric conductivity, etc. in conformity to the method of generating the droplets and controlling method of the spattering direction of the droplets.

In the following, one example of such recording device will be explained. It is not always necessary that the liquid recording medium is in the form of droplet immediately after the liquid recording medium leaves the orifice. It may leave the orifice in the form of liquid flow, but the liquid recording medium should be in the form of droplet at least when it reaches the recording member.

Figure 1:
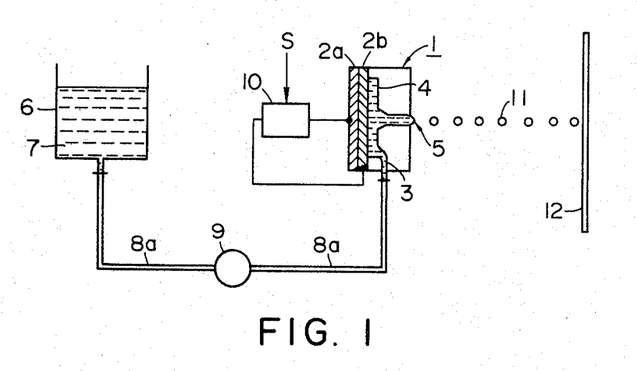
FIG. 1 is a schematic diagram of a recording head which generates droplets by causing pressure changes in the liquid recording medium through a piezo vibrator.

FIG. 1, for example, illustrates a device which performs recording by applying a recording signal to a recording head having a piezo-vibrator, and by generating droplets of the liquid recording medium in accordance with the recording signal. In the drawing, a reference numeral 1 designates the recording head having the piezo-vibrator 2a, a vibrating plate 2b, an inlet 3 for the liquid recording medium, a chamber 4 defined within the head and a discharge orifice 5. For the purpose of increasing the recording speed, a plurality of such recording heads are provided in some case. Into the chamber 4, the liquid recording medium 7 stored in a storage tank 6 is supplied through a supply pipeline 8a. On the half way of the supply pipeline 8a, there is sometimes provided an intermediate device 9 such as a pump or a filter. Between the piezo-vibrator 2a and the vibrating plate 2b, a recording signal S which has been converted into pulses by a signal processing device (e.g., a pulse converter) is applied, in accordance with which signal a pressure change occurs in the liquid recording medium within the chamber 4. As the result of this, the liquid recording medium 7 is discharged from the discharge orifice 5 in the form of droplets 11, and informations are recorded on the surface of the recording member 12. Incidentally, there are various modified types of such recording device, wherein number and shape of the chamber 4 of arrangement of the piezo-vibrator 2a are varied.

Figure 2:
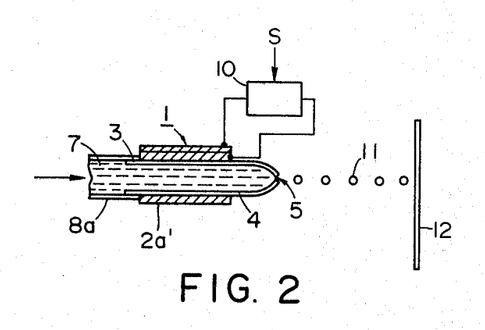
FIG. 2 is also a schematic diagram of the recording head, in which the chamber is formed in a nozzle shape and a cylindrical piezo vibrator being provided surrounding the outer periphery of the nozzle-shaped chamber.

FIG. 2 is a modified type of the recording device shown in FIG. 1, wherein the chamber 4 is constructed with a cylindrical glass tube, on the outer periphery of which a cylindrical piezo-vibrator 2a' is disposed. The droplet discharge principle of this recording device is the same as that shown in FIG. 1.

Figure 3:
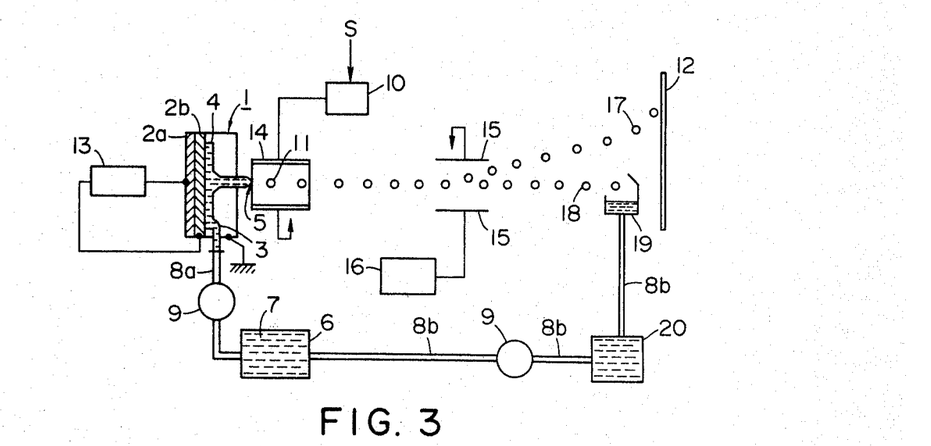
FIG. 3 is a schematic diagram of the recording head which performs recording by continuously generating charged droplets and deflecting the charged droplets by a deflecting field.

FIG. 3 shows another example of the recording device which performs recording by continuously generating droplets of the liquid recording medium, e.g., a device, in which the droplets are electrically charged in accordance with a recording signal, and thereafter the spattering direction of the droplets is controlled by deflecting electrodes (which are applied with a uniform electric field) to perform the recording. In this type of the device, a portion of the liquid recording medium which has not been used for the recording operation is recovered for re-use. In FIG. 3, reference numerals 1 to 12 and a reference symbol S designate the same component elements as those shown in FIG. 1, while numeral 8b refers to a recovering pipe for the liquid recording medium to be recovered without being used for the recording, a numeral 13 designates a pulse generator for generating droplets of the liquid recording medium, 14 refers to electrodes for charging the droplets of the liquid recording medium, 15 designates deflecting electrodes, 16 a power source, 17 droplets to be used for the recording, 18 droplets not used for the recording, 19 a recovery gutter, and 20 a recovery and storage tank for the recovered liquid recording medium.

For instance, when the recording device of the type shown in FIG. 1 is used, it is necessary that viscosity, surface tension, etc. of the liquid recording medium be in appropriate ranges. Since, also, the discharge orifice is an extremely fine port (usually in a range of 20 to 200 $\mu$m in diameter), the liquid recording medium should possess, as its important requirements, such properties that does not generate solidified substance during stoppage of the recording operation or storage of the liquid recording medium, which becomes liable to clog the orifice, and that is difficult to change its chemical properties or physical parameters, and others. Or, the liquid recording medium is also required to contain therein sufficient quantity of component for the recording agent so that a recorded image may exhibit high image contrast, to be excellent in its affinity for various kinds of recording members, and to be satisfactory in its penetrating and fixing properties.

With a view to satisfying such various conditions, there have heretofore been made various proposals. For instance, U.S. Pat. No. 4,106,027 discloses a liquid recording medium having a low viscosity of 5 c.p. or below and an electrical conductivity of $10^{-4}$ ohm$^{-1}$ cm$^{-1}$ or above, and which is principally composed of an organic solvent. The liquid recording medium is used in a recording device of a type as shown in FIG. 3, in which the droplets are charged. For the organic solvent, the prior patent uses, as its principal component, alkane or cycloalkane having the carbon content of from 5 to 8, lower alcohols, ethers (diethylether, dioxane, tetrahydrofuran), aromatic hydrocarbons, halogenated hydrocarbons, or esters.

On the other hand, there have also been known many kinds of liquid medium component system containing water. For example, U.S. Pat. No. 3,687,887 discloses an aqueous system liquid recording medium consisting of an organic resin binder such as styrene-maleic anhydride, etc., ether of polyhydric alcohol (particularly, glycol), and a coloring agent (carbon black and dyestuff suspended in water) so as to obtain a recorded image having high image density and good image-fixing property on the image forming base such as gelatin, resin film, etc.

Further, U.S. Pat. No. 3,705,043 teaches a liquid recording medium consisting of a coloring agent (carbon black and nigrosine dyestuff dispersed in water), a wetting agent (polyhydric alcohol, alkyl ether of polyhydric alcohol, or a mixture thereof), and water, with a view to obtaining an infrared ray absorptive image, exhibiting appropriate viscosity value over a long period of time, and not bringing about clogging of the discharge orifice.

U.S. Pat. No. 3,776,742 discloses an effective liquid recording medium having electric conductivity and surface tension of 35 to 70 dyn/cm, and consisting of a water soluble dyestuff, an electrically conductive substance (metal chlorides, etc.), a low molecular weight polyol, and a crystalline organic compound such as urea, etc. This aqueous system liquid recording medium is effective in quick image-fixing on a recording member such as paper which contains therein cellulose.

However, it is considerably difficult to obtain the liquid recording medium capable of satisfying simultaneously those various requirements as mentioned above, there still remain various points to be improved. For example, the liquid recording medium with an organic solvent as its principal constituent satisfies the indispensable condition to generate the droplets from a fine discharge orifice with favorable stability and responsiveness (in accordance with the hydrodynamic condition), i.e., a low viscosity (generally, 10 c.p. or below). However, many of the organic solvents have generally high volatility which tends to produce solid substance, and such solid substance is liable to clog the discharge orifice. The surface tension is also a factor to influence the discharge stability and responsiveness of the droplets, same as the viscosity, hence it should preferably be as large a value as possible. The value of the surface tension in the organic solvents, however, is considerably low in comparison with water (most of them usually have the surface tension of 25 dyn/cm or below). Further, while penetration of the liquid recording medium into the recording member (such as paper) is satisfactory, it has various disadvantages such that it produces remarkable running in the resulted image, hence low image resolution, and is poor in its dissolving stability of the components in the recording agent, hence sufficient quantity of the recording agent is difficult to be incorporated in the liquid recording medium, etc.

On the other hand, the penetrating the image-fixing properties of the liquid recording medium consisting of water as the principal constituent depend its penetrating and image-fixing properties upon the degree of sizing and gas permeability of the recording member. In case the recording is done on the recording member having high degree of sizing, the resulted image is prone to be thin or broken. In case a colored image is to be obtained, faithful color tone is difficult to be reproduced due to mixing of the liquid recording mediums of different color tones with the consequent lowering of the image resolution, and other inconveniences. With a view to improving such disadvantages, it has so far been a general practice to select a specific recording member having a low degree of sizing, although such recording member is not so practical in that it is not suitable for general purpose use. Moreover, there also exist such disadvantages that not only the water-resistant property of the recorded image is inferior, but also, when polyhydric alcohol is added to prevent the discharge orifice from clogging due to evaporations of water, if such polyhydric alcohol is incorporated to such an extent that the clog preventive effect can be attained to a satisfactory extent, the physical parameters such as viscosity, surface tension, etc. are difficult to be maintained in appropriate ranges, and temperature dependency of the physical parameters increases.

These are the factors to lower the printing characteristics of the liquid recording medium.

Under such circumstances, there have been strong demands for development of practical liquid recording medium capable of simultaneously satisfying the above-mentioned various conditions, being excellent in its recording property, and being suited for general purpose use. The present invention has been made in view of the afore-described various points of problem and as the result of studying from the abovementioned standpoints.

SUMMARY OF THE INVENTION

The present invention is directed to provide a liquid recording medium which satisfies all the conditions as mentioned in the foregoing, is excellent in its storage property and recording property, and is suited for general purpose use.

It is an object of the present invention to provide a liquid recording medium having appropriate physical parameters, being easy to regulate such physical parameters, and being excellent in the discharge stability and responsiveness of the droplets.

It is another object of the present invention to provide a liquid recording medium which is difficult to evaporate during its storage, or difficult to yield solidified substance due to chemical changes, etc. in the constituent elements, and which is excellent in its storage stability.

It is still another object of the present invention to provide a liquid recording medium which has expanded degree of freedom in selection of the components constituting the liquid recording medium, is satisfactory in its penetrating and image-fixing properties with respect to recording members of various qualities, and is easy to prepare.

According to the present invention, generally speaking, there is provided a liquid recording medium for use in a recording system, wherein the liquid recording medium is discharged from a discharge orifice formed in a recording head and spattered in the form of droplets for recording, the liquid recording medium containing therein carbonic acid ester compound having aliphatic radical.

DESCRIPTION OF THE PREFERRED EMBODIMENTS

The liquid recording medium according to the present invention contains, as its essential component, carbonic acid ester compound having an aliphatic organic residual radical, and is usually mixed with a recording agent to form an image.

The carbonic acid ester compound for use in the present invention is represented by the following general formula (A) or (B).

(where $R_1$ and $R_2$ are aliphatic radical having the carbon content of 10 or below, or preferably, 8 or below, such as alkyl, alkenyl, halogenated alkyl, and so on)

(where $R_3$ and $R_4$ are alkylene group having the carbon content of 10 or below, or preferably, 8 or below)

The compound represented by the general formula (A) is a diester of carbonic acid, and the compound represented by the general formula (B) is a cyclic carbonic acid ester.

Concrete examples of the compound represented by the general formula (A) are as follows.

|      | $R_1$ | $R_2$ | Name |
|------|-------|-------|------|
| (1)  | $CH_3$ | $CH_3$ | dimethyl carbonate |
| (2)  | $CH_3$ | $C_2H_5$ | methyl ethyl carbonate |
| (3)  | $CH_3$ | $C_3H_7$ | methyl propyl carbonate |
| (4)  | $CH_3$ | $n-C_4H_9$ | methyl n-butyl carbonate |
| (5)  | $CH_3$ | $iso-C_4H_9$ | methyl isobutyl carbonate |
| (6)  | $CH_3$ | $CH(CH_3)CH_2CH_2CH_3$ | methyl 1-methylbutyl carbonate |
| (7)  | $C_2H_5$ | $C_2H_5$ | diethyl carbonate |
| (8)  | $C_2H_5$ | $n-C_3H_7$ | ethyl propyl carbonate |
| (9)  | $C_2H_5$ | $iso-C_3H_7$ | ethyl isopropyl carbonate |
| (10) | $C_2H_5$ | $n-C_4H_9$ | ethyl n-butyl carbonate |
| (11) | $C_2H_5$ | $iso-C_4H_9$ | ethyl isobutyl carbonate |
| (12) | $C_2H_5$ | $sec-C_4H_9$ | ethyl sec-butyl carbonate |
| (13) | $C_2H_5$ | $-CH(CH_3)CH_2CH_2CH_3$ | ethyl 1-methylbutyl carbonate |
| (14) | $C_2H_5$ | $-CH(C_2H_5)_2$ | ethyl 1-ethylpropyl carbonate |
| (15) | $C_2H_5$ | $-CH(CH_3)CH(CH_3)_2$ | ethyl 1-methylisobutyl carbonate |
| (16) | $C_2H_5$ | $-CH_2CH_2CH(CH_3)_2$ | ethyl isopentyl carbonate |
| (17) | $C_2H_5$ | $-CH(CH_3)CH_2CH_2CH_2CH_3$ | ethyl 1-methylpentyl carbonate |
| (18) | $C_2H_5$ | $-CH(C_2H_5)CH_2CH_2CH_3$ | ethyl 1-ethylbutyl carbonate |
| (19) | $C_2H_5$ | $-CH(C_2H_5)CH(CH_3)_2$ | ethyl 1-ethylisobutyl carbonate |
| (20) | $C_2H_5$ | $-CH(CH_3)CH(CH_3)CH_2CH_3$ | ethyl 1,2-dimethylbutyl carbonate |
| (21) | $C_2H_5$ | $-CH(CH_2CH_2CH_3)_2$ | ethyl 1-propylbutyl carbonate |
| (22) | $C_2H_5$ | $-CH(C_2H_5)CH_2CH(CH_3)_2$ | ethyl 1-ethylisopentyl carbonate |
| (23) | $n-C_3H_7$ | $n-C_3H_7$ | di-n-propyl carbonate |
| (24) | $n-C_4H_9$ | $n-C_4H_9$ | di-n-butyl carbonate |
| (25) | $iso-C_4H_9$ | $iso-C_4H_9$ | diisobutyl carbonate |
| (26) | $sec-C_4H_9$ | $sec-C_4H_9$ | di-sec-butyl carbonate |
| (27) | $-CH_2CH_2CH(CH_3)_2$ | $-CH_2CH_2CH(CH_3)_2$ | diisopentyl carbonate |
| (28) | $-CH(CH_3)CH_2CH_2CH_3$ | $-CH(CH_3)CH_2CH_2CH_3$ | bis(1-methylbutyl) carbonate |
| (29) | $-CH(C_2H_5)_2$ | $-CH(C_2H_5)_2$ | bis(1-ethylpropyl) carbonate |
| (30) | $-CH(CH_3)CH(CH_3)_2$ | $-CH(CH_3)CH(CH_3)_2$ | bis(1-methylisobutyl) carbonate |
| (31) | $-CH(CH_3)CH_2CH_2CH_2CH_3$ | $-CH(CH_3)CH_2CH_2CH_2CH_3$ | bis(1-methylpentyl) carbonate |
| (32) | $-CH(C_2H_5)CH_2CH_2CH_3$ | $-CH(C_2H_5)CH_2CH_2CH_3$ | bis(1-ethylbutyl) carbonate |
| (33) | $-CH(C_2H_5)CH(CH_3)_2$ | $-CH(C_2H_5)CH(CH_3)_2$ | bis(1-ethylisobutyl) carbonate |
| (34) | $-CH(CH_3)CH(CH_3)CH_2CH_3$ | $-CH(CH_3)CH(CH_3)CH_2CH_3$ | bis(1,2-dimethylbutyl) carbonate |
| (35) | $-CH(CH_2CH_2CH_3)_2$ | $-CH(CH_2CH_2CH_3)_2$ | bis(1-propylbutyl) carbonate |
| (36) | $-CH(C_2H_5)CH_2CH(CH_3)_2$ | $-CH(C_2H_5)CH_2CH(CH_3)_2$ | bis(1-ethylisopentyl) carbonate |
| (37) | $-CH(CH_3)CH(C_2H_5)_2$ | $-CH(CH_3)CH(C_2H_5)_2$ | bis(1-methyl-2-ethylbutyl) carbonate |
| (38) | $C_2H_5$ | $-CH(CH_3)CH(C_2H_5)_2$ | ethyl 1-methyl-2-ethylbutyl carbonate |
| (39) | $C_2H_5$ | $-C(CH_3)=CH_2$ | ethyl isopropenyl carbonate |
| (40) | $C_2H_5$ | $-C(=CH_2)CH=C(CH_3)_2$ | ethyl isopropylidene-isopropenyl carbonate |
| (41) | $C_2H_5$ | $-C(CH_3)=CHCOCH_3$ | ethyl acetylisopropenyl carbonate |
| (42) | $C_2H_5$ | $-CHClCH_3$ | ethyl 1-chloroethyl carbonate |
| (43) | $C_2H_5$ | $-CHClCH_2Cl$ | ethyl 1,2-dichloroethyl carbonate |
| (44) | $-CHClCCl_3$ | $-CHClCCl_3$ | bis(1,2,2,2-tetrachloroethyl) carbonate |

-continued

| | R₁ | R₂ | Name |
|---|---|---|---|
| (45) | —C₂Cl₅ | —C₂Cl₅ | bis(pentachloroethyl) carbonate |

In these series of compounds, carbonic acid diester compound having a straight chain or branched alkyl group with the carbon content of 8 or below is preferably used as $R_1$ and $R_2$. Alkenyl group may also be selected for use as $R_1$ and $R_2$, provided that it guarantees satisfactory storage stability of the liquid recording medium which is a mixture of the compound with other components.

Preferably example of the compound represented by the general formula (B) is such one that the bond, $$-O-\underset{\underset{O}{\|}}{C}-O-,$$

forms a five-membered ring (or six-memberd ring) with the organic residual radical and $R_3$ and $R_4$ are selected from alkylene group having the carbon content of 4 or below. Typical cyclic carbonic acid esters are as follows.

| | R₃ | R₄ | NOMENCLATURE |
|---|---|---|---|
| (46) | —CH₂— | —CH₂— | ethylene carbonate |
| (47) |  | —CH₂— | propylene carbonate |

The abovementioned cyclic carbonic acid ester compounds are ther optimum for the purpose of the present invention, particularly, from the points of various characteristics they possess and of their availability.

The carbonic acid ester compounds as represented by the general formula (A) and (B) may be used as the carrier liquid component in its single form of ester (two or more kinds of the ester compounds may be mixed), although it is preferable that the compound is used in mixture with various sorts of solvent.

As the carrier liquid components which have so far been used, there can be enumerated water, organic solvent, and a mixture of these. In the present invention, the ester compound should preferably be used together with non-aqueous medium or a mixture of water and water-soluble non-aqueous medium to be listed below.

Non-aqueous solvents: alkylalcohols having 1 to 10 carbon atoms such as methyl alcohol, ethyl alcohol, n-propyl alcohol, iso-propyl alcohol, n-butyl alcohol, sec-butyl alcohol, tert-butyl alcohol, iso-butyl alcohol, amyl alcohol, hexyl alcohol, heptyl alcohol, octyl alcohol, nonylalcohol, decyl alcohol, etc.; hydrocarbon solvents such as hexane, octane, cyclopentane, benzene, toluene, xylol, etc.; halogenated hydrocarbon solvents such as carbon tetrachloridce, tricloroethylene, tetrachloroethane, dichlorobenzene, etc.; ether solvents such as ethylether, butylether, dioxane, tetrahydrofuran, etc.; ketone or ketone alcohol solvents such as acetone, methylethylketone, methylpropylketone, methylamylketone, cyclohexanone, diacetonealcohol, etc.; ester solvents such as ethyl formate, methyl acetate, propyl acetate, phenyl acetate, ethylene glycol monoethylether acetate, etc.; amides such as dimethylformamide, dimethylacetamide, etc.; alkyleneglycol, in which the alkylene group contains 2 to 6 carbon atoms such as ethyleneglycol, diethyleneglycol, triethyleneglycol, propyleneglycol, butyleneglycol, hexyleneglycol, etc.; polyalkyleneglycols such as polyethyleneglycol, polypropyleneglycol, etc.; lower alkylethers derived from alkyleneglycol such as ethyleneglycolmonomethyl-(-ethyl-or-propyl-)ether, diethyleneglycolmonomethyl-(-ethyl-or-butyl-)ether, diethyleneglycoldimethyl(or-ethyl-)ether, triethyleneglycolmonomethyl(or-ethyl-)ether, etc.; glycerol; alcohol amines such as ethanolamine, diethanolamine, triethanolamine, nitrogen-containing five-membered ring ketone such as pyrrolidone, N-methyl-2-pyrrolidone.

The abovementioned carrier liquids are suitably selected in consideration of their affinity for the recording agent and other additives to be added depending on necessity, and, in order to satisfy the foregoing requirements, they may be used as a mixture of two or more kinds, or a mixture with water, if necessary, within such a limit that a desirable recording medium is obtainable.

Of the above-enumerated carrier liquids, the water-soluble carrier liquids such as alkyl alcohol having the carbon content of up to 4, alkylene glycol, alcohol amine, lower alkyl mono- or di- ether (with total carbon content of from 3 to 8) derived from alkylene glycol (the alkylene group containing 2 to 6 carbon atoms), and N-methyl-2-pyrrolidone, etc. are preferable.

The content of the carbonic acid ester compound in the liquid recording medium can be varied in a farily wide range depending on the kind of the recording member, recording agent, and so on. For example, it may be in a range of from 5 to 99.5 wt. % based on the total weight of the liquid recording medium, or preferably from 10 to 99 wt. %, or most preferably from 20 to 99 wt. %.

A particularly suitable example of a mixture of the carbonic acid ester compound and the carrier liquid is that the content of the compound ranges from 35 to 90 wt. %, or more preferably from 55 to 80 wt. % based on the total weight of the liquid recording medium, when the non-aqueous carrier liquid such as, for example, alkyl alcohol, alkylene glycol, alcohol amine, lower alkyl mono- or di- ether derived from alkylene glycol is selected. In addition, the solvent system, wherein water is further added to the carrier liquid, provides more excellent liquid recording medium with respect to various characteristics. The content of the carbonic acid ester compound in this case ranges from 5 to 80 wt. %, or preferably from 5 to 50 wt. %, or more preferably from 5 to 30 wt. %. In this instance, the content of the non-aqueous type carrier liquid generally ranges from 5 to 50 wt. %, or preferably from 5 to 30 wt. %, and the content of water is from 5 to 70 wt. %, or preferably from 10 to 60 wt. %. As one optimum example of such mixture, there is a system such that a water-soluble dyestuff is dissolved in a liquid medium containing a cyclic carbonic acid ester compound (particularly, propylene carbonate), water and triethylene glycol monomethylether or triethylene glycolmonoethylether.

Another optimum example of mixture of the carbonic acid ester compound and the carrier liquid is a system, in which water-soluble dyestuff is dissolved in the carrier liquid containing cyclic carbonic acid ester compound (particularly, propylene carbonate), water and N-methyl-2-pyrrolidone. Incidentally, N-methyl-2-pyrrolidone as used here is a compound which has heretofore been added in a few percentum as a dyestuff solubilizer. In contrast to this, the liquid recording medium according to the present invention should preferably contain this compound in a range of from 5 to 50 wt. %, or preferably from 5 to 30 wt. %. N-methyl-2-pyrrolidone contained in the liquid recording medium in this range is used for stably mixing propylene carbonate and water as the carrier liquid component having a low viscosity, high boiling point, and high surface tension, as is the case with the aforementioned lower alkyl ether derived from polyhydric alcohol, and for stably dissolving various sorts of additives to be described later.

The recording agent has to be selected in relation to the abovementioned carrier liquid and to the additive materials so as to prevent sedimentation or coagulation in the nozzles and reservoir as well as clogging of pipes and orifices after prolonged standing. In the present invention, therefore, those recording agents soluble in the carrier liquid should preferably be used, although those recording agents which are difficult to solve in the carrier liquid may also be used for the purpose of the present invention so far as the size of dispersed particles is sufficiently small.

The recording agent to be employed in the present invention is to be suitably selected according to the image recording member and other recording conditions to be used in the recording. For this purpose, various kinds of conventionally known dyes and pigments can be effectively used.

The dyes that can be effectively employed in the present invention are those capable of satisfying the foregoing requirements for the prepared liquid recording medium, and including water-soluble dyes such as direct dyes, basic dyes, acid dyes, acid mordant dyes and mordant dyes; and water-insoluble dyes such as sulphur dyes, vat dyes, spirit dyes, and disperse dyes; and other dyes such as threne dyes, naphthol dyes, reactive dyes, mordant azo dyes, 1:2 complex dyes, 1:1 complex dyes, azoic dyes, cationic dyes, etc. Preferred examples of such dyes are Sumikaron Blue S-BG, Sumikaron Red E-EBL, Sumikaron Yellow E-4GL, Sumikaron Brilliant Blue S-BL, Sumifix Yellow GRS, Sumifix Red B, Sumifix Brilliant Red BS, Sumifix Brilliant Blue RB, Direct Black 40, Sumilan Black WA, Sumiacryl Yellow 3G, Methylene Blue conc. (above from Sumitomo Chemical); Dianix Yellow HG-SE, Dianix Red BN-SE, Diamira Brown 3G, Diamira Yellow G, Diamira Blue 3R, Diamira Brilliant Blue B, Diamira Brilliant Red BB, Diacid Blue 3G, Diacid Fast Green GW, Diacid Milling Navy Blue R, Indanthrene, Diacryl Orange RL-E, Diacryl Brilliant Blue 2B-E, Diacryl Turquoise Blue BG-E, Direct Fast Black B160, Direct Fast Black AB (above from Mitsubishi Chemical Industries); Kayalon Polyester Light Flavin 4GL, Kayalon Polyester Blue 3R-SF, Kayalon Polyester Yellow YL-SE, Kayaset Turquoise Blue 776, Kayaset Yellow 902, Kayaset Red 026, Procion Red H-2B, Procion Blue H-3R, Direct Fast Black B160 (above from Nippon Kayaku); Aizen Malachite Green, Aizen spiron Black GMH (above from Hodogaya Chemical Co., Ltd.); Vali Fast Red #3304, Vali Fast Yellow #3105, Orient Oil Black HBB, Water Black R455, Water Black L-200 (above from Orient Chemical Industries); Resolin Brilliant Blue PRL, Resolin Yellow PGG, Resolin Pink PRR, Resolin Green PB, Levafix Golden Yellow P-P, Levafix Brilliant Red P-B, Lavafix Brilliant Orange P-GR (above from Farbenfabriken Bayer A.G.); Remazol Red B, Remazol Blue 3R, Remazol Yellow GNL, Remazol Brilliant Green 6B (above from Farbwerke Hoechst A.G.); Cibacron Brilliant Yellow, Cibacron Brilliant Red 4GE, Oleosol dyes (above from Ciba Geigy); Indigo, Direct Deep Black E-Ex, Diamin Black BH, Congo Red, Sirius Black, Orange II, Amid Black 10B, Orange RO, Metanil Yellow, Victoria Scarlet, Nigrosine, Diamond Black PBB (above from I. G. Farbenindustrie A.G.).

For the pigments to be effectively used in the present invention, there may be enumerated a great many kinds out of those inorganic pigments and organic pigments.

The pigments which can be effectively used in the present invention include various inorganic and organic pigments, of which preferred are those having an elevated infrared absorbing efficiency when the infrared light is used as the source of thermal energy. Examples of such inorganic pigment include cadmium sulfide, sulfur, selenium, zinc sulfide, cadmium sulfoselenide, chrome yellow, zinc chromate, molybdenum red, guignet's green, titanium dioxide, zinc oxide, red iron oxide, green chromium oxide, red lead, cobalt oxide, barium titanate, titanium yellow, black iron oxide, iron blue, litharge, cadmium red, silver sulfide, lead sulfide, barium sulfate, ultramarine, calcium carbonate, magnesium carbonate, white lead, cobalt violet, cobalt blue, emerald green, carbon black etc.

Organic pigments are mostly classified as in the following, and some of them overlap with organic dyes. Preferred examples of such organic pigments effectively usable in the present invention are as follows:

(a) Insoluble azo-pigments (naphthols):
Brilliant Carmine BS, Lake Carmine FB, Brilliant Fast Scarlet, Lake Red 4R, Para Red, Permanent Red R, Fast Red FGR, Lake Bordeaux 5B, Bar Million No. 1, Bar Million No. 2, Toluidine Maroon;

(b) Insoluble azo-pigments (anilids):
Diazo Yellow, Fast Yellow G, Fast Yellow 100, Diazo Orange, Vulcan Orange, Ryrazolon Red;

(c) Soluble azo-pigments:
Lake Orange, Brilliant Carmine 3B, Brilliant Carmine 6B, Brilliant Scarlet G, Lake Red C, Lake Red D, Lake Red R, Watchung Red, Lake Bordeaux 10B, Bon Maroon L. Bon Maroon M;

(d) Phthalocyanine pigments:
Phthalocyanine Blue, Fast Sky Blue, Phthalocyanine Green;

(e) Lake pigments:
Yellow Lake, Eosine Lake, Rose Lake, Violet Lake, Blue Lake, Green Lake, Sepia Lake;

(f) Mordant dyes:
Alizarine Lake, Madder Carmine;

(g) Vat dyes:
Indanthrene, Fast Blue Lake (GGS);

(h) Basic dye lakes:
Rhodamine Lake, Malachite Green Lake;

(i) Acid dye lakes:
Fast Sky Blue, Quinoline Yellow Lake, quinacridone pigments, dioxazine pigments.

The quantitative relationship of these recording agent to the liquid recording medium is, in general, in a range of from 20 to 0.5 wt. %, or preferably from 15 to 0.5 wt. %, or more preferably from 10 to 1 wt. % with respect to the total weight of the liquid recording medium.

For the recording agent, it is preferred to use such according agent that is soluble in the carrier liquid.

However, even those recording agents which are dispersed or least soluble in the carrier liquid may be used by reducing the particle diameter of such recording agent when it is dispersed in the carrier liquid.

As stated above, the liquid recording medium of the present invention containing carbonic acid ester compound perfectly satisfies various requirements for the liquid recording medium used in this field. That is, the liquid recording medium is excellent in its recording characteristic, storage stability, responsiveness, general purpose use, and continuous recording characteristic over a long period of time. Also, degree of freedom of selecting the other component constituting the liquid recording medium such as the recording agent, carrier liquid, and so forth is remarkably increased, whereby the liquid recording medium having desired characteristics can be prepared arbitrarily and easily.

While the liquid recording medium according to the present invention may be prepared with the carrier liquid containing the carbonic acid ester compound and the recording agent as the basic constituents, as mentioned in the foregoing, there may be further added, for the purpose of providing more remarkable recording characteristics in the liquid recording medium, various kinds of additives such as, for example, a viscosity regulating agent, a surface tension regulating agent, a pH regulating agent, a mold preventive agent, a sterilizer, or (when there is employed a system of charging the liquid droplets), an electric conductivity regulating agent, and others. It is to be noted that, in the present invention, maintaining the pH value of the liquid recording medium at 7 by adding the pH regulating agent composed of an ordinary buffer liquid gives a favorable result in the long-term storage stability of the medium.

The liquid recording medium composition to be prepared as such exhibits various excellent properties. That is, it is excellent in uniformity of droplets and stability in the spattering direction thereof. Further, the medium does not cause undesirable clogging in the discharge orifice, hence the droplets can be produced smoothly any time. Furthermore, by appropriate selection of the carrier liquid to be coexistent with the recording medium, there can be produced recorded images having high image contrast and being excellent in water resistance, weather resistance and wear resistance on various recording members such as a resin base, recording paper of high or low degree of sizing, and so forth. The liquid recording medium composition according to the present invention can be easily prepared at a low cost and is suited for general purposes.

EXAMPLE 1

500 g of propylene carbonate was put into a beaker of 1 liter capacity. Subsequently, 15 g of "Orient Oil Black HBB" (C.I. 26150) was added with agitation. The mixture was further agitated sufficiently to thereby prepare a dyestuff solution of carbonic acid ester.

Next, the thus obtained solution was subjected to pressurized filtration using a fluoro-pore filter (product of Sumitomo Denko K.K., Japan) having a pore diameter of 1 micron to thereby remove solid impurities in the solution, thereby obtaining a liquid recording medium.

Thereafter, the recording property of the liquid recording medium thus obtained was examined by use of the recording device shown in FIG. 2 (having a discharge orifice diameter of approximately 70 microns and a driving voltage of approximately 30 volts). The recording property of the liquid recording medium as examined was on the continuous discharge stability by continuous operations of the recording device, the intermittent discharge stability when a 10 KHz signal was imparted with a time interval of 2 seconds, and the discharge responsiveness and change in external appearance of the liquid recording medium after leaving the same for three months. The results as shown in Table 1 below.

Also, for the sake of comparison, a conventional liquid recording medium (prepared by mixing 2.5 of Orient Oil Black HBB with 90 g of acetone, 0.9 g acetyl cellulose, and 15 g of water) was subjected to examination in its recording property. From the comparison, it was turned out that the liquid recording medium of the present invention showed favorable results in all of these abovementioned characteristics.

TABLE 1

|  |  | Example 1 | Comparative Example 1 |
|---|---|---|---|
| Discharge Stability | (*1) Continuous | Droplets of uniform size were discharged stably over a long period of time | Director of the droplets discharge was not stable. Occurrence of satellites could also be observed. |
|  | (*2) Intermittent | Highly stable | Satellites occurred. Discharging direction of droplets was not stable. |
| Storage Stability (*3) | Outer appearance and changes in physical properties | No change | Changed in physical parameters of the liquid was observed. |
|  | Discharge responsiveness (*4) | Good | Satellites occurred, or, in some occasion, clogging of orifice took place. |

(NOTES)
(*1) continuous operation in 10 KHz.
(*2) recording signal input of 10 KHz applied at 2-second interval
(*3) after 3-month leaving
(*4) discharge responsiveness to the initial input signal after the 3-month leaving The liquid recording medium compositions were prepared in exactly same procedures as above with the exception that the ingredients were replaced by those in the following Table 2. The above mentioned tests were carried out on the liquid recording medium compositions to obtain good results. Particularly, the composition containing propylene carbonate showed excellent results.

TABLE 2

| 1 - 1 |  | 1 - 2 |  |
|---|---|---|---|
| ethylpropyl carbonate | 500 g | di-n-butyl carbonate | 500 g |
| Sumilan Black WA (C.I. 15711) | 20 g | Vali Fast Red #3304 (C.I. 12715) | 20 g |
| cobalt naphthenate | 6 g |  |  |

| 1 - 3 |  | 1 - 4 |  |
|---|---|---|---|
| methylethyl carbonate | 450 g | diethyl carbonate | 400 g |
| diethylene glycol | 50 g | ethylene glycol | 100 g |
| Aizen Malachite Green (C.I. 42000) | 20 g | Methylene Blue Conc. (C.I. 52015) | 30 g |

| 1 - 5 |  | 1 - 6 |  |
|---|---|---|---|
| propylene carbonate | 400 g | propylene carbonate | 300 g |
| n-butyl carbonate | 100 g | ethylene carbonate | 200 g |
| Oil Black HBB (C.I. 26150) | 40 g | Sumilan Black WA | 30 g |

| 1 - 7 |  | 1 - 8 |  |
|---|---|---|---|
| propylene carbonate | 350 g | diethyl carbonate | 50 g |
| glycerine | 150 g | n-butyl carbonate | 50 g |

TABLE 2-continued

| Orient Oil Black HBB | 20 g | ethylene glycol | 200 g |
| --- | --- | --- | --- |
| | | de-ionized water | 180 g |
| | | Direct Fast Black B160 | 20 g |

EXAMPLE 2

The same procedures were followed in preparing the liquid recording medium as in Example 1 above except for using those components shown in the following Table 3. Good results were obtained from this liquid recording medium.

TABLE 3

| 2-1 | | 2-2 | |
| --- | --- | --- | --- |
| ethyl-n-butyl carbonate | 300 g | propylene carbonate | 300 g |
| ethanol | 50 g | diethylene glycol | 100 g |
| de-ionized water | 100 g | ethanol | 30 g |
| Water Black R-455 | 7 g | de-ionized water | 100 g |
| (C.I. 50420) | | Direct Fast Black B160 | 8 g |

In particular, it was observed that the liquid recording medium containing propylene carbonate was excellent in its discharge stability and storage stability.

Further, in place of propylene carbonate, ethylsec-butyl carbonate or ethylene carbonate was used. In either case, good results were obtained in respect of the discharge stability of the liquid recording medium.

EXAMPLE 3

A solution consisting of the following components was filtered in the same procedure as in Example 1 above, thereby obtaining a liquid recording medium.
Diethyl carbonate: 400 g
Ethanol: 50 g
De-ionized water: 100 g
Water Black R-455 (C.I. 50420) (product of Orient Kagaku Kogyo K.K., Japan): 7 g The liquid recording medium prepared in the above-described manner was subjected to examination on its recording property by use of a recording device (having a driving voltage of 15 volts, 200 μsec., and a maximum response frequency of 2 KHz) having a recording head constructed with nozzles made of glass (with 10 numbers/mm of nozzle), each having a discharge orifice for the liquid recording medium (the orifice diameter of about 50 microns), and an electric heat converter (heat generating body) provided in contact with and surrounding a part of the nozzle. The test results were favorable. Incidentally, ethylpropyl carbonate was used in place of diethyl carbonate to obtain substantially the same result as above.

EXAMPLE 4

A liquid recording medium was prepared in the same manner as in Example 1 by use of the components shown in Table 4 below, and the recording operations were conducted with this liquid recording medium on various clases of recording member by means of the recording device shown in FIG. 1.

For the sake of comparison, a liquid recording medium not containing propylene carbonate was also prepared.

TABLE 4

| Composition | Ex. 4 | Comp. Ex. 2 | Comp. Ex. 3 |
| --- | --- | --- | --- |
| propylene carbonate | 50 g | — | — |
| triethylene glycol monoethyl ether | 100 g | — | 100 parts |
| diethylene glycol | 50 g | 200 g | 100 parts |
| Water Red 2 (C.I. 45380) | 15 g | 15 g | 15 parts |
| Water | 285 g | 285 g | 285 parts |

The quality of the image obtained was examined, and the results as shown in the following Table 5 were obtained.

TABLE 5

| Recording Member (Brand Name) | Classification | Manufacturer | Ex. 4 | | Comp. Ex. 2 | | Comp. Ex. 3 | |
| --- | --- | --- | --- | --- | --- | --- | --- | --- |
| | | | Fixing Property[1] | Water Resistant Property[2] | Fixing Property[1] | Water Resistant Property[2] | Fixing Property[1] | Water Resistant Property[2] |
| SK coat | Coated Paper | Sanyo Kokusaku Pulp K.K. | Good | Good | Poor | Poor | Poor | Poor |
| High coat | Coated Paper | Nippon Kako Seishi K.K. | " | " | " | " | " | " |
| NK Special One-Side Art | Art Paper | Nippon Kako Seishi K.K. | " | " | " | " | " | " |
| Ginkan | High Quality Paper | Sanyo Kokusaku Pulp K.K. | " | " | " | " | " | " |
| Seven Star | High Quality Paper | Hokuetsu Seishi K.K. | " | " | " | " | Slight Breakage | " |
| Shiro Botan | Medium Quality Paper | Honshu Seishi K.K. | " | " | " | " | Slight Breakage | " |
| Toyo Roshi No. 2 | Non-sized Paper | Toyo Roshi K.K. | " | " | Good | " | Good | " |

(NOTE)
[1]After printing for 60 seconds, the printed portion was rubbed by a finger to determine presence or absence of ink breakage.
[2]After lapse of 5 minutes from the printing, the recording member was immersed in water to determine running of ink.

As seen from the above Table 5, the liquid recording medium according to the present invention produced high quality images which are excellent not only in their discharge stability and responsiveness, but also in its fixing and water resistant properties with respect to various kinds of the recording member used. Further the liquid recording medium of the present invention did not cause clogging of the discharge orifice of the nozzle, even when it was left for more than a few months. In particular, when a small quantity of aqueous solution of phosphoric acid was added to the liquid recording medium to maintain its pH value at approximately 7, the abovementioned effect was remarkable.

EXAMPLE 5

A liquid recording medium (5-1) of the following composition was prepared in the same manner as in Example 1 above, and the image quality obtained with this liquid recording medium was examined in the same manner as in Example 4 above. Excellent results were obtained in both image-fixing and water resistant properties.

Propylene carbonate: 100 g
    Triethylene glycol monomethyl ether: 160 g
    N-methyl-2-pyrrolidone: 30 g
    De-ionized water: 130 g
    Water Black L-200 (C.I. 35255)—product of Orient Kagaku Kogyo K.K.: 75 g In place of the above mentioned liquid recording medium, the compositions in the following Table 6 were prepared into the liquid recording medium, and the image qualities were examined in the same manner as in Example 4 above. Excellent results were obtained. When a small quantity of phosphoric acid solution was added to the liquid recording medium compositions to maintain the pH value at about 7, the storage stability was further prolonged.

TABLE 6

| 5 - 2 | | 5 - 3 | |
|---|---|---|---|
| propylene carbonate | 125 g | propylene carbonate | 100 g |
| diethylene glycol | 125 g | diethylene glycol monomethyl ether | 50 g |
| de-ionized water | 185 g | triethanol amine | 50 g |
| Direct Fast Black AB (C.I. 35440) - product of Mitsubishi Kasei Kogyo K.K. | 15 g | de-ionized water | 175 g |
| | | Water Black L-200 (C.I. 35255) - product of Orient Kagaku Kogyo K.K. | 125 g |

| 5 - 4 | | 5 - 5 | |
|---|---|---|---|
| propylene carbonate | 100 g | propylene carbonate | 150 g |
| diethylene glycol | 200 g | triethylene glycol monomethyl ether | 150 g |
| diethylene glycol monobutyl ether | 50 g | N-methyl-2-pyrrolidone | 50 g |
| de-ionized water | 115 g | de-ionized water | 75 g |
| | | Water Black L-200 (C.I. 35255) - product of Orient Kagaku Kogyo K.K. | 75 g |
| Direct Fast Black B160 (C.I. 35440) - product of Mitsubishi Kagaku Kogyo K.K. | 20 g | | |

Example 6

In exactly same method as in Example 1, liquid recording mediums 6-1 and 6-2 as shown in the following Table 7 were prepared. Also, as a Comparative Example 4, a liquid recording medium not containing propylene carbonate was prepared as in Table 7. The surface tension and viscosity at different temperature levels of these liquid recording mediums are also shown in the table.

TABLE 7

| Composition | 6-1 | 6-2 | Comp.Ex.4 |
|---|---|---|---|
| propylene carbonate | 100g | 100g | — |
| N-methyl-2-pyrrolidone | 150g | — | — |
| triethylene glycol monomethyl ether | — | 150g | 150g |
| glycerine | — | — | 100g |
| Water | 235g | 235g | 235g |
| Direct Fast Black B(C.I.35435) | 15g | 15g | 15g |
| viscosity (C.P.) 0° C. | 11.0 | 13.7 | 21.9 |
| 20° C. | 4.1 | 5.0 | 5.2 |
| 40° C. | 2.9 | 3.2 | 3.4 |
| surface tension (dyn/cm, 25° C.) | 45.2 | 44.9 | 45.2 |

As seen from the above Table, the liquid recording medium of the present invention possesses sufficiently high surface tension at a room temperature, and also small increase in its viscosity, even when the ambient temperature lowers.

The thus obtained liquid recording medium was used in the recording device employed in Example 1 above, and the following tests $T_1$ to $T_5$ were conducted under the recording conditions shown in Table 8 below. The results of the tests are shown in Table 9 below. It is observed from the Table that the liquid recording medium of the present invention was successful in carrying out the high quality recording with stability.

TABLE 8

| Orifice diameter | 65 microns |
|---|---|
| Driving conditions for piezo element | 65 volts |
| Maximum response frequency | 5 KHz |
| Recording member | "Ginkan" A-size (high quality paper of Sanyo Kokusaku Pulp K.K.) |

Test $T_1$ . . . Continuous recording for 36 hours.

Test $T_2$ . . . Intermittent recording with 1-hour stoppage after each of 10-minute continuous recording.

Test $T_3$ . . . After 10-minute continuous recording, the recording member was left for 24 hours, and then it was again subjected to the recording.

Test $T_4$ . . . The tip end of the orifice was left for one month without being covered with a cap, after which recording was done using this orifice.

Test $T_5$ . . . Continuous recording for 3 hours in an ambient test chamber at 0° C.

TABLE 9

| Test Condition | Present Invention | Comparative Example |
|---|---|---|
| $T_1$ | Stable ink discharge | Stable ink discharge |
| $T_2$ | " | Satellites occurred from time to time |
| $T_3$ | " | Ink discharge stopped from time to time |
| $T_4$ | " | No ink discharge |
| $T_5$ | " | Ink discharge stopped completely 20 minutes after start of the printing |

EXAMPLE 7

With the following compositions, liquid recording mediums in three original colors were prepared.

(A) Cyan Ink

Water Blue #9 (C.I. 42090): 10 g
    Propylene carbonate: 100 g
    N-methyl-2-pyrrolidone: 100 g
    Diethylene glycol: 50 g
    Ion-exchanged water: 240 g (B) Magenta Ink
Water Pink #2 (C.I. 42090): 15 g
Propylene carbonate: 100 g
N-methyl-2-pyrrolidone: 100 g
Diethylene glycol: 50 g
Ion-exchanged water: 235 g
(C) Yellow Ink
Water Yellow #1 (C.I. 19140): 20 g
Propylene carbonate: 100 g
N-methyl-2-pyrrolidone: 100 g
Diethylene glycol: 50 g
Ion-exchanged water: 230 g.

The abovementioned components were mixed, while avoiding mixing of air in considerable quantity, and dissolved to obtain a solution of uniform composition. To this solution, a small quantity of phosphoric acid solution was added to maintain the pH value of the solution at approximately 7. Further the liquid composition was filtered, followed by egassing treatment. After this, the filtered liquid was accommodated in a cassette container made of polyvinyl chloride, and the container was tightly sealed.

A set of cassette containers for three colors were disposed at their respective predetermined positions in the recording device shown in FIG. 2, and the tests $T_1$ to $T_3$ in Example 6 under the recording conditions shown in Table 10 were conducted. In each case, the recording operations could be performed stably, and the quality of the recorded image was extremely good from the start to the end of the recording operations, whereby the multi-color original could be reproduced with faithful color tone. In place of N-methyl-2-pyrrolidone, triethylene glycol monomethyl ether was used with good result.

EXAMPLE 8

Liquid recording mediums of the compositions as shown in Table 11 below were prepared in the same manner as in Example 1. With these liquid recording mediums, recording was carried out by means of the recording device shown in FIG. 3 which continuously produces electrically charged droplets (discharge orifice diameter of 40 microns, and driving voltage of 80 V). All these liquid recording medium could exhibit stable discharge, and image of good quality could be obtained.

TABLE 11

| | Composition | |
|---|---|---|
| 8-1 | Methylene Blue (C.I. 52015) | 5g |
| | Propylene carbonate | 225g |
| | Triethylene glycol monomethyl ether | 100g |
| | Lithium chloride | 5g |
| | Water | 165g |
| 8-2 | Direct Deep EX (C.I. 30235) | 20g |
| | Propylene carbonate | 25g |
| | N-methyl-2-pyrrolidone | 50g |
| | Ethylene glycol | 50g |
| | Triethanol amine | 25g |
| | Water | 330g |
| 8-3 | Water Black L-200 (C.I. 35255) | 50g |
| | Propylene carbonate | 25g |
| | Triethylene glycol monoethyl ether | 200g |
| | Lauryl sodium benzene sulfonate | 0.5g |
| | GROTAN (a trademark for anti-mold and sterilizing agent manufactured by Sanai Sekiyu K.K.) | 0.5g |
| | Water | 224g |
| 8-4 | Kaya Acryl Brilliant Pink B (B.R. 27) | 15g |
| | Propylene carbonate | 50g |
| | N-methyl-2-pyrrolidone | 100g |
| | Triethylene glycol | 100g |

TABLE 11-continued

| | Composition | |
|---|---|---|
| | Water | 235g |
| 8-5 | Water Black L-200 (Product of Orient Kagaku Kogyo K.K.) | 20g |
| | Propylene carbonate | 20g |
| | Ethylene carbonate | 10g |
| | Triethylene glycol monomethyl ether | 10g |
| | Water | 40g |
| 8-6 | Water Black L-200 (product of Orient Kagaku Kogyo K.K.) | 20g |
| | Propylene carbonate | 20g |
| | Ethylene carbonate | 10g |
| | N-methyl-2-pyrrolidone | 10g |
| | Triethylene glycol monomethyl ether | 10g |
| | Water | 30g |
| 8-7 | Water Black L-200 (product of Orient Kagaku Kogyo K.K.) | 20g |
| | Propylene carbonate | 25g |
| | Dimethyl carbonate | 5g |
| | N-methyl-2-pyrrolidone | 10g |
| | Triethylene glycol monomethyl ether | 5g |
| | Water | 35g |

What is claimed is:

1. A liquid recording medium for use in a recording device, wherein said liquid recording medium is discharged from a discharge orifice in a recording head of the device and spattered in the form of droplets, for recording, characterized in that said liquid recording medium contains therein a coloring agent and a carbonic acid ester compound represented by the general formula A as follows:

$$R_1-O-\underset{\underset{O}{\|}}{C}-O-R_2 \qquad (A)$$

wherein $R_1$ and $R_2$, which may be the same or different, each represents an alkyl, alkenyl or haloalkyl radical, wherein the content of said carbonic acid ester in said liquid recording medium is from 5 to 99.5 percent by weight based on the total weight of the liquid recording medium.

2. The liquid recording medium as set forth in claim 1, wherein the content of said carbonic acid ester in said liquid recording medium is in a range of from 10 to 99% by weight based on the total weight of said liquid recording medium.

3. The liquid recording medium as set forth in claim 1 wherein each of said $R_1$ has straight or branched chains with a carbon content of 10 carbon atoms or below.

4. The liquid recording medium as set forth in claim 1, wherein said carbonic acid ester compound is an alkyl diester of a carbonic acid wherein said alkyl groups are straight or branched chain alkyl groups having a carbon content of 8 carbon atoms or below.

5. The liquid recording medium as set forth in claim 1, characterized by further comprising a non-aqueous type carrier liquid.

6. The liquid recording medium as set forth in claim 5, wherein the content of said carbonic ester compound in said liquid recording medium ranges from 35 to 90% by weight based on the total weight of said liquid recording medium.

7. The liquid recording medium as set forth in claim 5, wherein the content of said carbonic acid ester compound in said liquid recording medium ranges from 55 to 80% by weight based on the total weight of said liquid recording medium.

8. The liquid recording medium as set forth in claim 5, wherein said non-aqueous type carrier liquid is selected from the group consisting of aliphatic monohydric alcohol, polyhydric alcohol, alcohol amine and lower alkyl mono- or di-ether derived from polyhydric alcohol.

9. The liquid recording medium as set forth in claim 8, wherein said lower alkyl mono- or di-ether derived from polyhydric alcohol is selected from triethylene glycol monomethyl ether and triethylene glycol monoethyl ether.

10. A liquid recording medium for use in a recording system, wherein said liquid recording medium is discharged from a discharge orifice in a recording head of the device and spattered in the form of droplets for recording characterized in that said liquid recording medium essentially consists of (a) coloring agent, (b) a non-aqueous carrier liquid, (c) water and (d) a carbonic acid ester represented by the general formula A as follows:

wherein $R_1$ and $R_2$, which may be the same or different, each represents an alkyl, alkenyl or haloalkyl radical, wherein the content of said carbonic acid ester in said liquid recording medium is from 5 to 99.5 percent by weight, based on the total weight of the liquid recording medium.

11. The liquid recording medium as set forth in claim 10, wherein the content of said carbonic acid ester compound in said liquid recording medium ranges from 5 to 80% by weight based on the total weight of the liquid recording medium.

12. The liquid recording medium as set forth in claim 10, wherein the content of said carbonic acid ester compound in said liquid recording medium ranges from 5 to 50% by weight based on the total weight of the liquid recording medium.

13. The liquid recording medium as set forth in claim 10, wherein the content of said carbonic acid ester compound in said liquid recording medium ranges from 5 to 30% by weight based on the total weight of the liquid recording medium.

14. The liquid recording medium as set forth in claim 10, wherein the content of said non-aqueous system carrier liquid in said liquid recording medium ranges from 5 to 50% by weight based on the total weight of the liquid recording medium.

15. The liquid recording medium as set forth in claim 10, wherein the content of said non-aqueous system carrier liquid in said liquid recording medium ranges from 5 to 30% by weight based on the total weight of the liquid recording medium.

16. The liquid recording medium as set forth in claim 10, wherein said $R_1$ and $R_2$ are both a straight chain or branched chain with a carbon content of 8 carbon atoms or below.

17. The liquid recording medium as set forth in claim 10, wherein said carbonic acid ester compound is an alkyl diester of a carbonic acid wherein said alkyl group is a straight chain or branched chain alkyl group having 8 or less carbon atoms.

18. The liquid recording medium as set forth in claim 10, wherein the content of water in said liquid recording medium ranges from 5 to 70% by weight based on the total weight of the liquid recording medium.

19. The liquid recording medium as set forth in claim 13, wherein said non-aqueous type carrier liquid is selected from aliphatic monohydric alcohol, polyhydric alcohol, nitrogen-containing five-membered ring ketone, alcohol amine, and lower alkyl mono- or di-ether derived from polyhydric alcohol.

20. The liquid recording medium as set forth in claim 19, wherein said nitrogen-containing five-membered ring ketone is N-methyl-2-pyrrolidone.

21. The liquid recording medium as set forth in claim 20, wherein the content of said N-methyl-2-pyrrolidone in said liquid recording medium ranges from 5 to 50% by weight based on the total weight of the liquid recording medium.

22. The liquid recording medium as set forth in claim 20, wherein the content of said N-methyl-2-pyrrolidone in said liquid recording medium ranges from 5 to 30% by weight based on the total weight of the liquid recording medium.

23. The liquid recording medium as set forth in claim 10, wherein said lower alkyl mono- or di- ether derived from polyhydric alcohol is selected from triethylene glycol monomethyl ether and triethylene glycol monoethyl ether.

24. In the process for recording information comprising ejecting and spattering a colored liquid recording medium as droplets from an orifice onto a recording member, the improvement comprising: employing in said liquid recording medium a carbonic acid ester compound in amounts from 5 to 99.5 percent by weight based on the total weight of the recording medium, said carbonic ester compound being represented by the general formula A or B as follows:

wherein $R_1$ and $R_2$, which may be the same or different, each represents an alkyl, alkenyl or haloalkyl, radical and wherein $R_3$ and $R_4$, which may be the same or different, together form a cyclic alkylene group.

25. The recording process as set forth in claim 24, wherein each of said $R_1$ and $R_2$ represents a straight-chain or branched chain radical having up to about 10 carbon atoms, and wherein said $R_3$ and $R_4$ together form a cyclic alkylene group having up to 20 carbon atoms.

26. The recording process as set forth in claim 24, wherein the content of said carbonic acid ester compound in said liquid recording medium is in a range of from 10 to 99% by weight based on the total weight of said liquid recording medium.

27. The recording process as set forth in claim 24, wherein each of said $R_1$, $R_2$, $R_3$ and $R_4$ has a straight or branched-chain with a carbon content of 10 carbon atoms or below.

28. The recording process as set forth in claim 24, wherein said carbonic acid ester compound is an alkyl diester of a carbonic acid wherein the alkyl groups are straight or branched-chain alkyl groups with a carbon content of 8 carbon atoms or below.

29. The recording process as set forth in claim 24, wherein said carbonic acid ester compound is a cyclic carbonic acid ester having an alkylene group with a carbon content of 4 carbon atoms or below.

30. The recording process as set forth in claim 29, wherein said carbonic acid ester compound is selected from ethylene carbonate and propylene carbonate.

31. The recording process as set forth in claim 24, characterized by further comprising a non-aqueous type carrier liquid.

32. The recording process as set forth in claim 31, wherein the content of said carbonic ester compound in said liquid recording medium ranges from 35 to 90% by weight based on the total weight of said liquid recording medium.

33. The recording process as set forth in claim 31, wherein the content of said carbonic acid ester compound in said liquid recording medium ranges from 55 to 80% by weight based on the total weight of said liquid recording medium.

34. The recording process as set forth in claim 31, wherein said non-aqueous type carrier liquid is selected from the group consisting of aliphatic monohydric alcohol, polyhydric alcohol, alcohol amine and lower alkyl mono- or di- ether derived from polyhydric alcohol.

35. The recording process as set forth in claim 34, wherein said lower alkyl mono- or di- ether derived from polyhydric alcohol is selected from triethylene glycol monomethyl ether and triethylene glycol monoethyl ether.

36. A liquid recording medium for use in a recording device, wherein said liquid recording medium is discharged from a discharge orifice in a recording head of the device and spattered in the form of droplets, for recording, characterized in that said liquid recording medium contains therein a coloring agent and a carbonic acid ester compound represented by the general formula B as follows:

(B)

wherein $R_3$ and $R_4$, which may be the same or different, together form a cyclic alkylene group, and wherein the content of said carbonic acid ester in said liquid recording medium is from 20 to 99 percent by weight based on the total weight of the liquid recording medium.

37. The liquid recording medium as set forth in claim 30, wherein said alkylene group has a carbon content of 4 carbon atoms or below.

38. The liquid recording medium as set forth in claim 36, characterized by further comprising a non-aqueous type carrier liquid.

39. The liquid recording medium as set forth in claim 38, wherein the content of said carbonic ester compound in said liquid recording medium ranges from 35 to 90% by weight based on the total weight of said liquid recording medium.

40. The liquid recording medium as set forth in claim 38, wherein the content of said carbonic acid ester compound in said liquid recording medium ranges from 55 to 80% by weight based on the total weight of said liquid recording medium.

41. The liquid recording medium as set forth in claim 38, wherein said non-aqueous type carrier liquid is selected from the group consisting of aliphatic monohydric alcohol, polyhydric alcohol, alcohol amine and lower alkyl mono- and di- ether derived from polyhydric alcohol.

42. The liquid recording medium as set forth in claim 41, wherein said lower alkyl mono- or di- ether derived from polyhydric alcohol is selected from triethylene glycol monomethyl ether and triethylene glycol monoethyl ether.

43. The liquid recording medium as set forth in claim 37, wherein said carbonic acid ester compound is selected from ethylene carbonate and propylene carbonate.

44. The liquid recording medium as set forth in claim 1, wherein said $R_3$ and $R_4$ together form an alkylene group with a carbon content of 4 carbon atoms or below.

45. A liquid recording medium for use in a recording system, wherein said liquid recording medium is discharged from a discharge orifice in a recording head of the device and spattered in the form of droplets for recording characterized in that said liquid recording medium essentially consists of (a) coloring agent, (b) a non-aqueous carrier liquid, (c) water and (d) a carbonic acid ester represented by the general formula B as follows:

(B)

wherein $R_3$ and $R_4$, which may be the same or different, together form a cyclic alkylene group, wherein the content of said carbonic acid ester in said liquid recording medium is from 20 to 99 percent by weight, based on the total weight of the liquid recording medium.

46. The liquid recording medium as set forth in claim 45, wherein the content of said non-aqueous system carrier liquid in said liquid recording medium ranges from 5 to 50% by weight based on the total weight of the liquid recording medium.

47. The liquid recording medium as set forth in claim 45, wherein the content of said non-aqueous system carrier liquid in said liquid recording medium ranges from 5 to 30% by weight based on the total weight of the liquid recording medium.

48. The liquid recording medium as set forth in claim 45, wherein the content of water in said liquid recording medium ranges from 5 to 70% by weight based on the total weight of the liquid recording medium.

49. The liquid recording medium as set forth in claim 45, wherein said non-aqueous type carrier liquid is selected from aliphatic monohydric alcohol, polyhydric alcohol, nitrogen-containing five-membered ring ketone, alcohol amine, and lower alkyl mono- and di- ether derived from polyhydric alcohol.

50. The liquid recording medium as set forth in claim 45, wherein said lower alkyl mono- or di- ether derived from polyhydric alcohol is selected from triethylene glycol monomethyl ether and triethylene glycol monoethyl ether.

51. The liquid recording medium as set forth in claim 49, wherein said nitrogen-containing five-membered ring ketone is N-methyl-2-pyrrolidone.

52. The liquid recording medium as set forth in claim 51, wherein the content of said N-methyl-2-pyrrolidone in said liquid recording medium ranges from 5 to 50% by weight based on the total weight of the liquid recording medium.

53. The liquid recording medium as set forth in claim 51, wherein the content of said N-methyl-2-pyrrolidone in said liquid recording medium ranges from 5 to 30% by weight based on the total weight of the liquid recording medium.

54. The liquid recording medium as set forth in claim 45, wherein said carbonic acid ester compound is selected from ethylene carbonate and propylene carbonate.

55. In the process for recording information comprising ejecting and spattering a colored liquid recording medium as droplets from an orifice onto a recording member, the improvement comprising employing a liquid recording medium which essentially consists of (a) coloring agent, (b) a non-aqueous carrier liquid, (c) water and (d) a carbonic acid ester compound represented by the general formula A or B as follows:

wherein $R_1$ and $R_2$, which may be the same or different, each represents an alkyl, alkenyl or haloalkyl radical, wherein $R_3$ and $R_4$, which may be the same or different, together form a cyclic alkylene group, and wherein the content of said carbonic acid ester compound in said liquid recording medium is from 5 to 99.5 percent by weight, based on the total weight of the liquid recording medium.

56. The recording process as set forth in claim 55, wherein the content of said carbonic acid ester compound in said liquid recording medium ranges from 5 to 80% by weight based on the total weight of the liquid recording medium.

57. The recording process as set forth in claim 55, wherein the content of said carbonic acid ester compound in said liquid recording medium ranges from 5 to 50% by weight based on the total weight of the liquid recording medium.

58. The recording process as set forth in claim 55, wherein the content of said carbonic acid ester compound in said liquid recording medium ranges from 5 to 30% by weight based on the total weight of the liquid recording medium.

59. The recording process as set forth in claim 55, wherein the content of said non-aqueous system carrier liquid in said liquid recording medium ranges from 5 to 50% by weight based on the total weight of the liquid recording medium.

60. The recording process as set forth in claim 55, wherein the content of said non-aqueous system carrier liquid in said liquid recording medium ranges from 5 to 30% by weight based on the total weight of the liquid recording medium.

61. The recording process as set forth in claim 55, wherein each of said $R_1$, $R_2$, $R_3$ and $R_4$ is a straight or branched chain group with a carbon content of 8 carbon atoms or below.

62. The recording process as set forth in claim 55, wherein said carbonic acid ester compound is an alkyl diester of a carbonic acid wherein the alkyl groups are straight chain or branched chain alkyl groups with a carbon content of 8 carbon atoms or below.

63. The recording process as set forth in claim 55, wherein said carbonic acid ester compound is a cyclic carbonic acid ester having an alkylene group with a carbon content of 4 carbon atoms or below.

64. The recording process as set forth in claim 55, wherein said carbonic acid ester compound is selected from ethylene carbonate and propylene carbonate.

65. The recording process as set forth in claim 55, wherein the content of water in said liquid recording medium ranges from 5 to 70% by weight based on the total weight of the liquid recording medium.

66. The recording process as set forth in claim 55, wherein said non-aqueous type carrier liquid is selected from aliphatic monohydric alcohol, polyhydric alcohol, nitrogen-containing five-membered ring ketone, alcohol amine, and lower alkyl mono- or di- ether derived from polyhydric alcohol.

67. The recording process as set forth in claim 55, wherein said lower alkyl mono- or di- ether derived from polyhydric alcohol is selected from triethylene glycol monomethyl ether and triethylene glycol monoethyl ether.

68. The recording process as set forth in claim 66, wherein said nitrogen-containing five-membered ring ketone is N-methyl-2-pyrrolidone.

69. The recording process as set forth in claim 68, wherein the content of said N-methyl-2-pyrrolidone in said liquid recording medium ranges from 5 to 50% by weight based on the total weight of the liquid recording medium.

70. The recording process as set forth in claim 68, wherein the content of said N-methyl-2-pyrrolidone in said liquid recording medium ranges from 5 to 30% by weight based on the total weight of the liquid recording medium.

* * * * *

UNITED STATES PATENT AND TRADEMARK OFFICE
CERTIFICATE OF CORRECTION

PATENT NO. : 4,281,329
DATED : July 28, 1981
INVENTOR(S) : YASUHIRO YANO, ET AL.

It is certified that error appears in the above—identified patent and that said Letters Patent is hereby corrected as shown below:

Abstract - Pg. 1 - change "contains" to --containing--.
Col. 2, line 58, change "does" to --do--.
Col. 4, line 4, after "penetrating" change "the" to --and--.
Col. 6, line 20, change "group" to --groups--.
Col. 10, line 68, change "according" to --recording--.
Col. 12, line 7, change "as" to --are--.
Col. 14, line 13, change "clases" to --classes--.
Col. 15, line 55, after "exactly" add --the--.
Col. 17, line 19, change "egassing" to --degassing--.
Col. 17, line 45, change "medium" to --mediums--.

Signed and Sealed this

Sixteenth Day of February 1982

[SEAL]

Attest:

Attesting Officer

GERALD J. MOSSINGHOFF

Commissioner of Patents and Trademarks